(12) United States Patent
Liou et al.

(10) Patent No.: US 6,278,446 B1
(45) Date of Patent: *Aug. 21, 2001

(54) SYSTEM FOR INTERACTIVE ORGANIZATION AND BROWSING OF VIDEO

(75) Inventors: Shih-Ping Liou, Robbinsville, NJ (US); Madirakshi Das, Amherst, MA (US)

(73) Assignee: Siemens Corporate Research, Inc., Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,637

(22) Filed: Feb. 23, 1998

(51) Int. Cl.[7] .................................................. G06F 3/00
(52) U.S. Cl. ........................ 345/328; 345/327; 345/356; 382/168
(58) Field of Search ................................... 345/328, 327, 345/348, 349, 356, 431; 386/4, 52; 348/700–703; 382/168, 206

(56) References Cited

U.S. PATENT DOCUMENTS 5,821,945 * 10/1998 Yeo et al. ............................. 345/440
5,915,250 * 6/1999 Jain et al. ............................. 707/100

OTHER PUBLICATIONS

I/Browse: The Bellcore Video Library Toolkit, England et al., Storage and Retrieval for Still Image and Video Databases IV, SPIE, vol. 2670, 1996, pp. 254–264.
Video Browsing Using Clustering and Scene Transitions on Compressed Sequences; Yeung et al., Multimedia Computing and Networking, SPIE vol. 2417, 1995, pp. 399–413.
Automatic Parsing of News Video, Zhang et al., International Conference on Multimedia Computing and Systems, 1994, pp. 45–54.
Knowledge Guided Parsing in Video Databases, Swanberg et al., Storage and Retrieval for Image and Video Databases, SPIE vol. 1908, 1993, pp. 13–25.
Video Indexing Through Integration of Syntactic and Semantic Features, Gunsel et al., IEEE Multimedia Systems, 1996, pp. 90–95.
Content–based Browsing of Video Sequences, Arman et al., ACM Multimedia, Aug. 1994, pp. 97–103.
Time–constrained Clustering for Segmentation of Video into Story Units, Yeung et al., International Conference on Pattern Recognition, 1996, pp. 375–380.
The Automatic Real–Time Analysis of Film Editing and Transition Effects and its Applications, Aigrain et al., Computer and Graphics, vol. 18, No. 1, 1994, pp. 93–103.

(List continued on next page.)

Primary Examiner—Raymond J. Bayerl
Assistant Examiner—Sy D. Luu
(74) Attorney, Agent, or Firm—Adel A. Ahmed

(57) ABSTRACT

A system for interactively organizing and browsing video automatically processes video, creating a video table of contents (VTOC), while providing easy-to-use interfaces for verification, correction, and augmentation of the automatically extracted video structure. Shot detection, shot grouping and VTOC generation are automatically determined without making restrictive assumptions about the structure or content of the video. A nonstationary time series model of difference metrics is used for shot boundary detention. Color and edge similarities are used for shot grouping. Observation about the structure of a wide class of videos are used for the generating the table of contents. The use of automatic processing in conjuction with input from the user provides a meaningful video organization.

21 Claims, 18 Drawing Sheets

(11 of 18 Drawing Sheet(s) Filed in Color)

OTHER PUBLICATIONS

Digital Video Segmentation, Hampapur et al., Proc. ACD Multimedia Conference, 1994, pp. 357–363.

Scene Change Detection in a MPEG Compressed Video Sequence, Meng et al., SPIE vol. 2419, Digital Video Compression Algorithms and Technologies, 1995, pp. 14–25.

Automatic Partitioning of Full–Motion Video, Zhang et al., ACM Multimedia Systems, 1, 1993, pp. 10–28.

Indexing via Color Histograms, Swain et al., Third International Conference on Computer Vision, 1990, pp. 390–393.

Outliers in Time Series, Fox et al., Journal of the Royal Statistical Society, Series B, 34, 1972, pp. 350–363.

Outlier Detection and Time Series Modeling, Abraham et al., Technometrics, vol. 31, No. 2, May 1982, pp. 241–248.

A Brief Review on Tests for Detection of Time Series Outliers, Hotta et al., Estadistica, 44, 142, 1992, pp. 103–148.

A Statistical Approach of Scene Change Detection, Sethi et al., SPIE vol. 2420, Storage and Retrieval for Image and Video Databases III, 1995, pp. 329–338.

The ISCC–NBS Method of Designating Colors and A Dictionary of Color Names, Kelly et al., National Bureau of Standards Circular 553, Nov. 1, 1955.

X. Wu, Color Quantizer v. 2, Graphic Gems, vol. II, pp. 126–133.

* cited by examiner

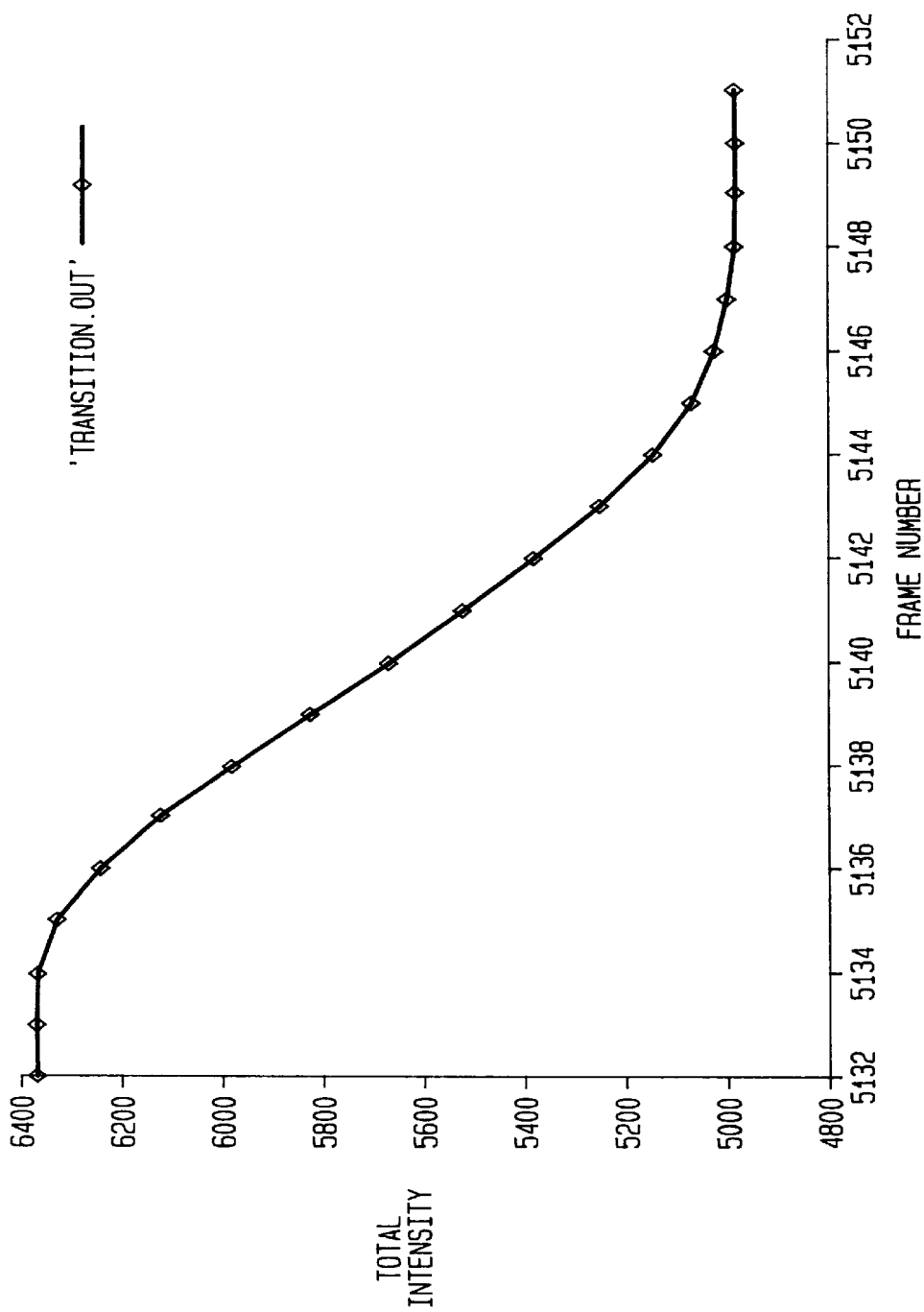

FIG. 6A
(PRIOR ART)

| RED | GREEN | REDDISH PURPLE | REDDISH BROWN |
|---|---|---|---|
| REDDISH ORANGE | BLUISH GREEN | PURPLISH RED | BROWN |
| ORANGE | GREENISH BLUE | PURPLISH PINK | YELLOW GREEN |
| ORANGE YELLOW | BLUE | PINK | YELLOWISH BROWN |
| YELLOW | PURPLISH BLUE | YELLOWISH PINK | OLIVE BROWN |
| GREENISH YELLOW | VIOLET | BROWNISH PINK | OLIVE |
| YELLOWISH GREEN | PURPLE | BROWNISH ORANGE | OLIVE GREEN |

FIG. 6B
(PRIOR ART)

LIGHTNESS (MUNSELL VALUE)

| VERY PALE | VERY LIGHT | BRILLIANT | |
|---|---|---|---|
| PALE / LIGHT GRAYISH | LIGHT | | |
| GRAYISH | MODERATE | STRONG | VIVID |
| DARK GRAYISH | DARK | DEEP | |
| BLACKISH | VERY DARK | VERY DEEP | |

SATURATION (MUNSELL CHROMA)

SYSTEM FOR INTERACTIVE ORGANIZATION AND BROWSING OF VIDEO

FIELD OF THE INVENTION

This invention relates to video organization and browsing, and in particular, to a system for automatically organizing raw video into a tree structure that represents the video's organized contents, and allowing a user to manually verify, correct, and augment the automatically generated tree structure.

BACKGROUND OF THE INVENTION

Multimedia information systems include vast amounts of video, audio, animation, and graphics information. In order to manage all this information efficiently, it is necessary to organize the information into a usable format. Most structured videos, such as news and documentaries, include repeating shots of the same person or the same setting, which often convey information about the semantic structure of the video. In organizing video information, it is advantageous if this semantic structure is captured in a form which is meaningful to a user.

Prior attempts have been made in organizing video. Database systems typically use attribute-based indexing that involves manually segmenting video into meaningful semantic units. Multimedia information is abstracted by reducing the scope for posing ad hoc queries to the multimedia database. See P. England et al., I/Browse: The Bellcore Video Library Toolkit, Storage and Retrieval for Still Image and Video Databases IV, SPIE, 1996. Attribute-based indexing, however, is extremely time consuming because a human operator manually indexes the multimedia information.

Computer vision systems typically use an automatic, integrated feature extraction/object recognition subsystem which eliminates the manual video segmentation of attribute-based indexing. See M. M. Yeung et al., Video Browsing using Clustering and Scene Transitions on Compressed Sequences, Multimedia Computing and Networking, SPIE vol. 2417, pp 399–413, 1995; H. J. Zhang et al., Automatic parsing of news video, International Conference on Multimedia Computing and Systems, pp 45–54, 1994; and D. Swanberg et al., Knowledge guided parsing in video databases, Storage and Retrieval for Image and Video Databases, SPIE vol. 1908, pp 13–25, 1993. These automatic methods attempt to capture the semantic structure of video, however, they are computationally expensive and difficult, extremely domain specific, and create hierarchies or indexes with only a few fixed number of levels. For example, in the article by Zhang et al., known templates of anchor person shots are used to separate news stories. A shot in video refers to a contiguous recording of one or more raw frames of video depicting a continuous action in time and space. In the article by Swanberg et al., news videos are segmented or parsed using a known scene structure of news programs and models of anchor person shots. News videos have also been segmented by using the presence of a channel logo, the skin tones of the anchor person and the scene structure of the news episode. See B. Gunsel et al., Video Indexing through Integration of Syntactic and Semantic Features, IEEE Multimedia Systems, pp 90–95, 1996. Content-based indexing at the shot level using motion (without developing a high-level description of the video) has been described by F. Arman et al., Content-based browsing of video sequences, ACM Multimedia, pp 97–103, August, 1994.

Domain dependent approaches, however, can not be used to capture the semantic structure in video for all possible scenarios, even for a very simple domain such as the news. For example, not every news story in a news broadcast begins with an anchor person shot and it is difficult to define an anchor person image model that is generic to all broadcast stations.

A domain-independent approach that extracts story units for video browsing applications, has been described by M. M. Yeung et al., Time-constrained Clustering for Segmentation of Video into Story Units, International Conference on Pattern Recognition, C, pp. 375–380, 1996. FIG. 1 shows a scene transition graph which provides a compact representation that serves as a summary of the story and may also provide useful information for automatic classification of video types. The scene transition graph is generated by detecting shots, identifying shots that have similar visual appearances, and detecting story units. However, the graph reveals only limited information about the semantic structure within a story unit. For example, an entire news broadcast is classified as one single story, making it difficult for users to browse through the news stories individually.

Capturing the semantic structure in a video requires accurate shot detection and the shot grouping. Most existing shot detection methods are based on preset thresholds or assumptions that reduce their applicability to a limited range of video types. For example, many existing methods make assumptions about how shots are connected in videos, ignoring how films/videos are produced and edited in reality. See P. Aigrain et al., The Automatic Real-Time Analysis of Film Editing and Transition Effects and its Applications, Computer and Graphics, Vol. 18, No. 1, pp. 93–103, 1994; A. Hampapur et al., Digital Video Segmentation, Proc. ACM Multimedia Conference, pp. 357–363, 1994; and J. Meng et al., Scene Change Detection in a MPEG Compress ed Video Sequence, SPIE Vol. 2419, Digital Video Compression Algorithms and Technologies, pp. 14–25, 1995. These methods often assume that both the incoming and outgoing shots are static scenes with transitions which last for a period no longer than half a second. These assumptions do not provide sufficient data for modeling gradual shot transitions that are often present in films/videos. Existing shot detection methods also assume that time-series difference metrics are stationary, ignoring the fact that such metrics are highly correlated time signals. It is also assumed that the frame difference signal computed at each individual pixel can be modeled by a stationary, independent, identically distributed random variable which obeys a known probability distribution such as the Gaussian or Laplace. See H. Zhang et al., Automatic Parsing of Full-Motion Video, ACM Multimedia Systems, 1, pp. 10–28, 1993. FIGS. 2A and 2B are histograms of typical inter-frame difference images that do not correspond to shot changes. FIG. 2A, shows a histogram as the camera moves slowly left. FIG. 2B depicts as the camera moves quickly right. The curve of FIG. 2A is shaped differently from the curve of FIG. 2B. Neither a Gaussian nor a Laplace fits both of these curves well. A Gamma function fits the curve of FIG. 2A well, but not the curve of FIG. 2B.

Additionally, many videos are converted from films. Video and films are played at different frame rates thus, every other film frame is made a little bit longer to convert it to video. Consequently, the video frames are made up of two fields with totally different (although consecutive) pictures in them. As a result, the digitization produces duplicate video frames and almost zero inter-frame differences at five frame intervals. A similar problem occurs in animated videos such as cartoons except, it produces almost zero inter-frame differences in as often as every other frame.

Color histograms are typically used for grouping visually similar shots as described in M. J. Swain et al., Indexing via Color Histograms, Third International Conference on Computer Vision, pp. 390–393, 1990. However, a color histogram's ability to detect similarities when illumination variations are present is substantially affected by the color space used and color space quantizing. Commonly used RGB and HSV color spaces are sensitive to illumination factors in varying degrees, and uniform quantization goes against the principles of human perception. See G. Wyszecki et al., Color Science: Concepts and Methods, Quantitative Data and Formulae, John Wiley & Sons, Inc. 1982.

Thus, in practice, it is difficult to obtain a useful video organization based solely on automatic processing.

Accordingly, there is a need for a system which makes automatically extracted video structures more meaningful and useful.

SUMMARY OF THE INVENTION

A system for interactively organizing and browsing raw video to facilitate browsing of video archives includes automatic video organizing means for automatically organizing raw video into a hierarchical structure that depicts the video's organized contents. A user interface means is provided for allowing a user to view and manually edit the hierarchical structure to make the hierarchical structure substantially useful and meaningful to the user.

One aspect involves a method for automatically grouping shots into groups of visually similar shots, each group of shots capturing structure in raw video, the shots generated by detecting abrupt scene changes in raw frames of the video which represent a continuous action in time and space. The method includes the steps of providing a predetermined list of color names and describing image colors in each of the shots using the predetermined list of color names. The shots are clustered into visually similar groups based on the image colors described in each of the shots, and image edge information from each of the shots is used to identify and remove incorrectly clustered shots from the groups.

Another aspect involves a method for automatically organizing groups of visually similar shots, which capture structure in a video, into a hierarchical structure that depicts the video's organized contents. The hierarchical structure includes a root node which represents the video in its entirety, main branches which represent story units within the video, and secondary branches which represent structure within each of the story units. The method includes the steps of finding story units using the groups of shots, each of the story units extending to a last re-occurrence of a shot which occurs within the story unit, and creating a story node for each of the story units, the story nodes defining the main branches of the hierarchical structure. The structure within each of the story units is found and the structure is attached as a child node to the main branches, the child node defining the secondary branches of the hierarchical structure.

Still another aspect involves a method for interactively organizing and browsing video. The method includes the steps of automatically organizing a raw video into a hierarchical structure that depicts the video's organized contents and viewing and manually editing the hierarchical structure to make the hierarchical structure substantially useful and meaningful to the user.

BRIEF DESCRIPTION OF THE DRAWINGS

The advantages, nature and various additional features of the invention will appear more fully upon consideration of the illustrative embodiments now to be described in detail in connection with the accompanying drawings. The file of this patent contains at least one drawing executed in color. Copies of this patent with color drawing(s) will be provided by the Patent and Trademark Office upon request and payment of the necessary fee. In the drawings:

FIGS. 5B and 5C demonstrate how a split ahead is processed by the browser interface;

FIG. 6A shows a list of hue names used in a prior art NBS system;

FIG. 6B shows the hue modifiers used in the prior art NBS system;

DETAILED DESCRIPTION OF THE INVENTION

Figure 1:
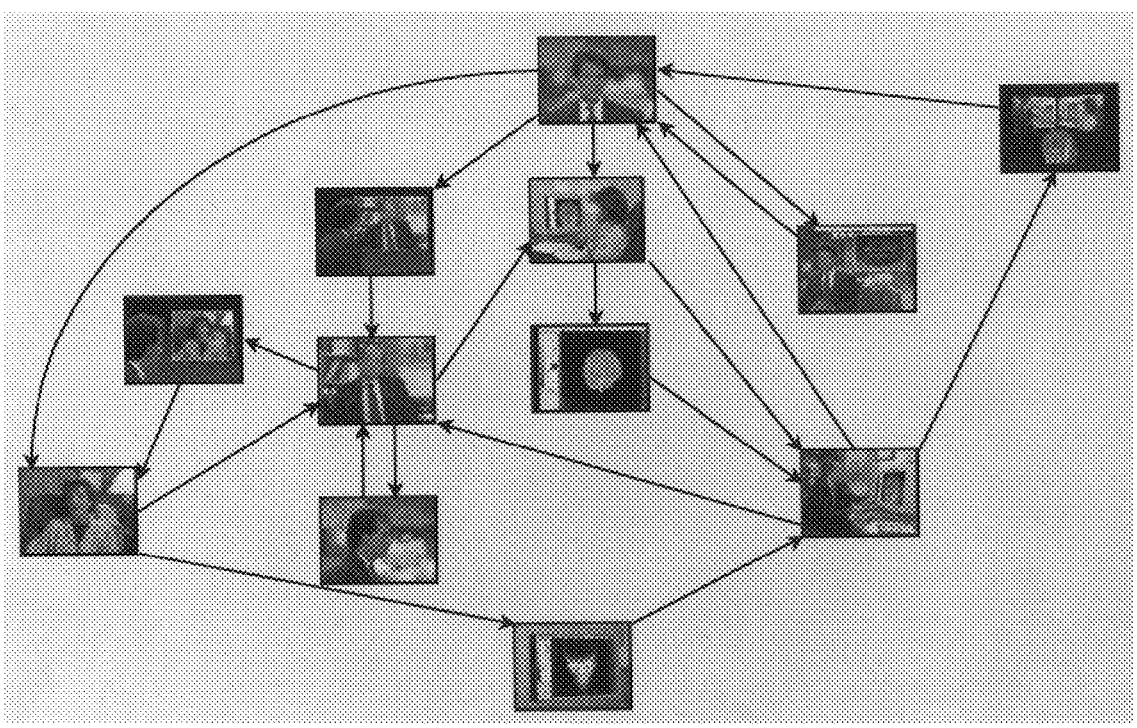
FIG. 1 shows a scene transition graph in accordance with the prior art.
Figure 2A:
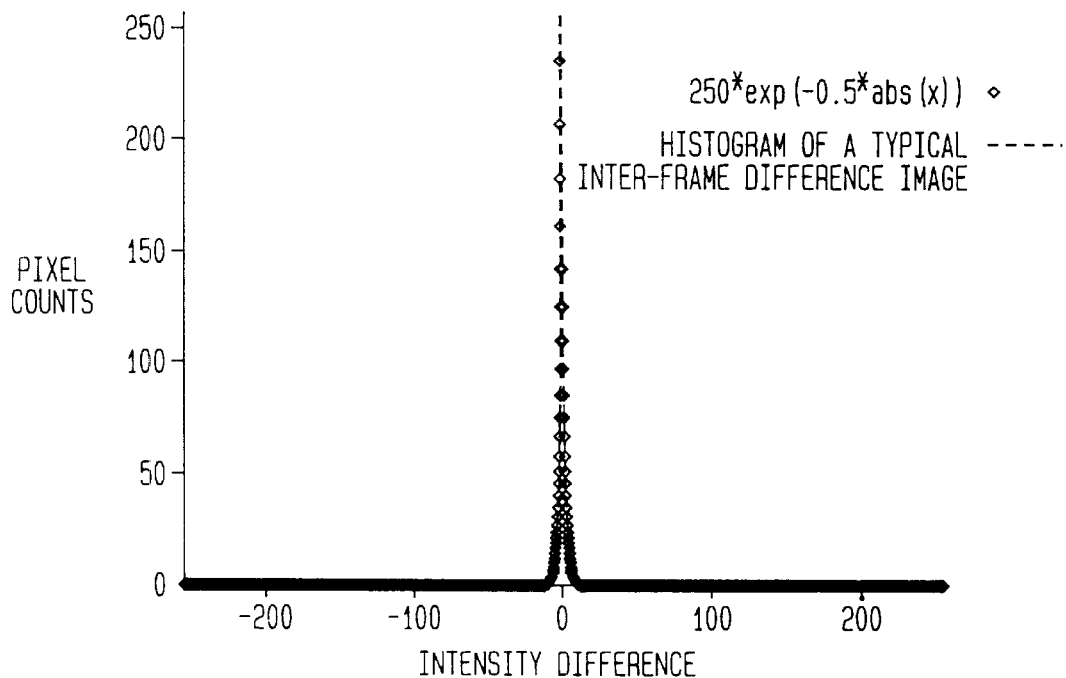
FIGS. 2A and 2B depict histograms of typical inter-frame difference images used in the prior art.
Figure 2B:
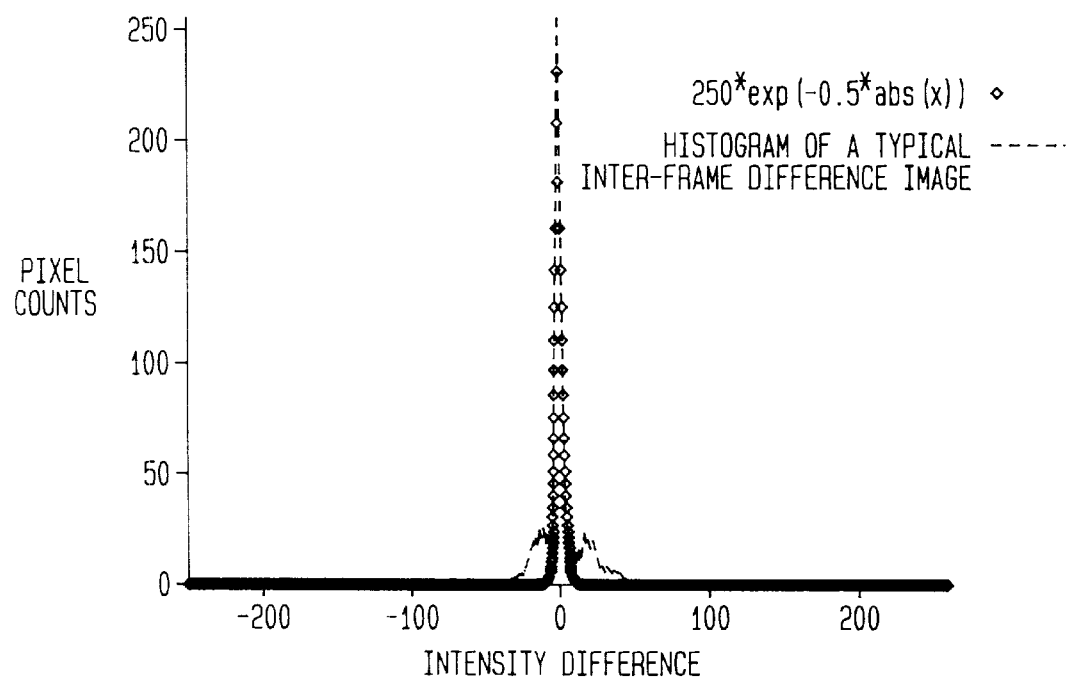
Figure 3:
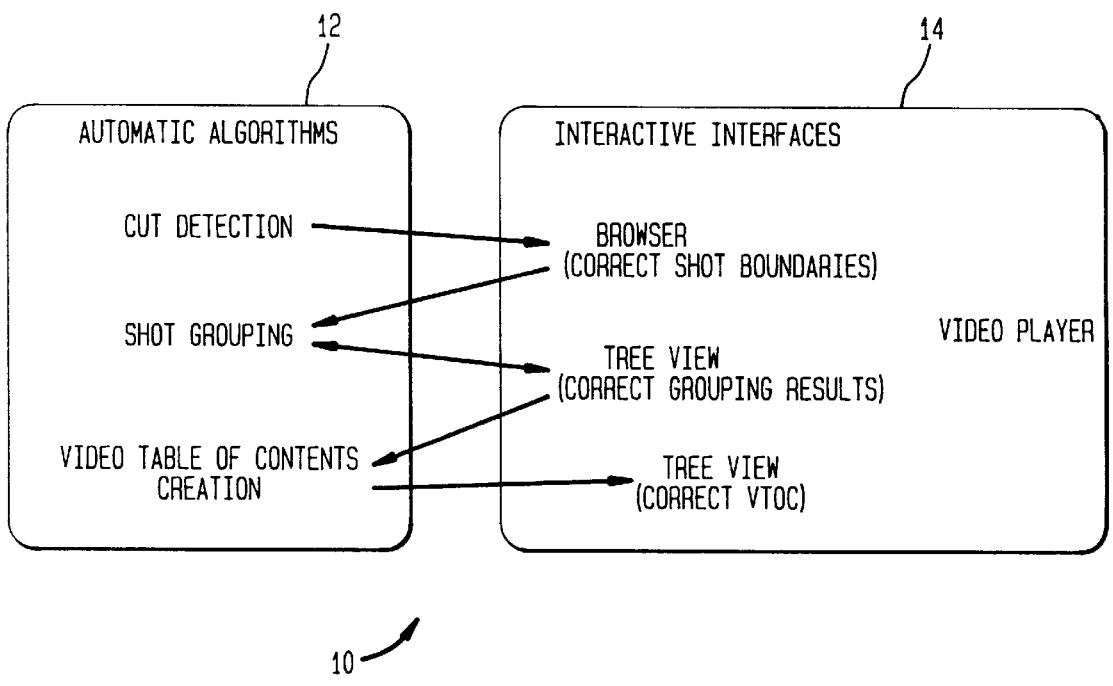
FIG. 3 is a block diagram illustrating the video organizing system of the present invention.

Referring to FIG. 3, a block diagram illustrating the video organizing system of the present invention is shown. The video organizing system 10 is implemented on a computer (not shown) and comprises three automatic video organizing methods 12 closely integrated with three user interactive video organization interfaces 14 (graphic user interfaces). The automatic video organizing methods 12 include an automatic shot boundary (cut) detection method, an automatic shot grouping method, and a method for automatically generating a hierarchical "tree" structure representing a video table of contents (VTOC). The graphic user interfaces 14 include a browser interface, a tree structure viewer interface, and a video player interface.

Figure 4:
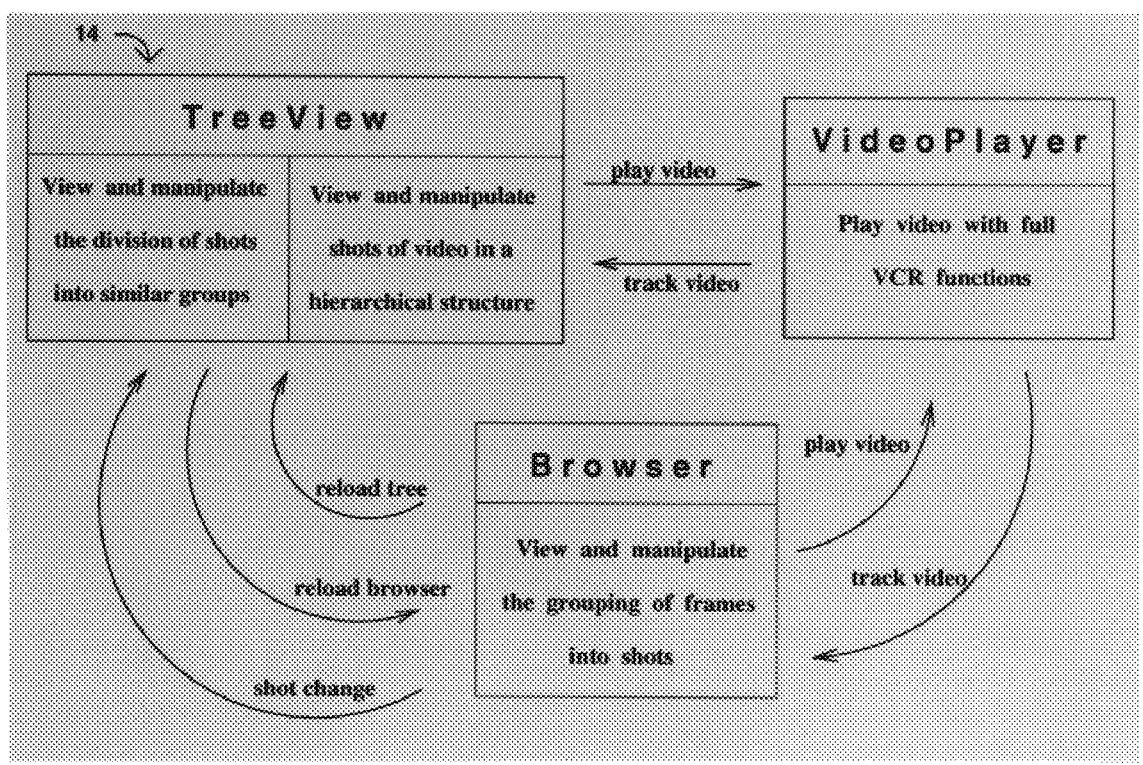
FIG. 4 is a block diagram illustrating the interactions among the graphic user interfaces.

FIG. 4 is a block diagram illustrating the interactions among the graphic user interfaces 14. The graphic user interfaces provide the automatic video organizing methods with manual feedback during the automatic creation of the tree structure. Mistakes made by the automatic cut detection and/or shot grouping methods will not allow the automatic tree structure method to produce a useful and meaningful tree structure. The graphic user interfaces enable a user to interact with each of the automatic video organizing methods to verify, correct, and augment the results produced by each of them. The graphic user interfaces communicate with each other so that changes made using one interface produce the appropriate updates in the other interfaces. It is very useful for a user to see how changes made at one level propagate to the other levels, and to move between levels. The three interfaces can be operated separately or together in any combination. Any one of the three interfaces can start the other interfaces. Accordingly, any one of them can be started first, provided the required files are present as will be explained further on.

The video organizing system is based on the assumption that similar repeating shots which alternate or interleave with other shots, are often used to convey parallel events in a scene or to signal the beginning of a semantically meaningful unit. This is true of a wide variety of structure videos such as news, sporting events, interviews, documentaries, and the like. For example, news and documentaries have an anchor-person appearing before each story to introduce it. Interviews have an interviewer appearing to ask each new question. Sporting events have sports action between stadium shots or commentator shots. Accordingly, a tree structure can be created directly from a list of similar identified repeating shots. The tree structure preserves the time order among shots and captures the syntactic structure of the video. The syntactic structure is a hierarchical structure composed of stories, sub-plots within the stories, and further sub-plots embedded within the sub-plots. For most structured videos, the tree structure provides interesting insights into the semantic context of a video which is not possible using prior art scene transition graphs and the like.

In organizing raw video, the system first automatically recovers the shots present in the video by automatically organizing raw frames of the video into shots using the automatic cut detection method. The cut detection method automatically detects scene changes and provides good shot boundary detection in the presence of outliers and difficult shot boundaries like fades and zooms. Each shot is completely defined by a start frame and an end frame and a list of all shots in a video is stored in a shot-list. Each shot is represented by a single frame, the representative frame, which is stored as an image icon.

The automatic cut detection method implements a cut detection method that combines two pixel-based difference metrics: inter-frame difference metrics and distribution-based difference metrics. These two difference metrics respond differently to different types of shots and shot transitions. For example, an interframe difference metrics are very sensitive to camera moves, but are very good indicators for shot changes. Distribution-based metrics are relatively insensitive to camera and object motion, but produce little response when two shots look quite different but have similar distributions. These differences in sensitivity make it advantageous to combine them for cut detection.

The sequence of difference metrics are modeled as non-stationary time series signals. The sequence of difference metrics, no matter how they are computed, are just like any economic or statistical data collected over time. Thus, shot changes as well as film-to-video conversion processes create observation outliers in time series. In turn, gradual shot transition and gradual camera moves produce innovation outliers. An observation outlier is caused by a gross error of observation or by a recording error, and only affects a single observation. Similarly, an innovation outlier corresponds to a single extreme "innovation", and affects both the particular observation and subsequent observations. There are standard methods for detecting both innovation and observation outliers based on the estimate of time trend and autoregressive coefficients. See A. J. Fox, Outliers in Time Series, Journal of the Royal Statistical Society, Series B, 34, pp. 350–363, 1972; B. Abraham et al., Outlier Detection and Time Series Modeling, Technometrics, Vol. 31, No. 2, pp. 241–248, May 1982; and L. K. Hotta et al., A Brief Review of Tests for Detection of Time Series Outliers, Estadistica, 44, 142, 143, pp. 103–148, 1992. These methods, however, cannot be applied to the cut detection directly, because of the following three reasons. First, most methods require intensive computation, using least squares or the like, to estimate time trend and autoregressive coefficients. This amount of computation is generally not desired. Second, the observation outliers created by slow motion and the film-to-video conversion process could occur as often as one in every other sample, making the time trend and autoregressive coefficient estimation an extremely difficult process. Finally, since gradual shot transitions and gradual camera moves are indistinguishable in most cases, location of gradual shot transitions requires not only the detection of innovation outliers but also an extra camera motion estimation step.

Accordingly, the automatic cut detection method preferably implements a method that uses a zeroth-order autoregressive model and a piecewise-linear function to model the time trend. With this simplification, samples from both the past and the future are used in order to improve the robustness of time trend estimation. More than half the samples may be discarded because the observation outliers created by slow motion and film-to-video conversion processes may occur as often as one in every other sample. However, these types of observation outliers are least in value and are easily identified. After the time trend is removed, the remaining value is tested against a normal distribution N (0, s) in which s can be estimated recursively or in advance.

To make the automatic cut detection more robust, a modified Kolmogorov-Smirnov test for eliminating false positives is preferably implemented by the cut detection method. This test is selected because it does not assume a priori knowledge of the underlying distribution function. A traditional Kolmogorov-Smirnov test procedure compares the computed test metric with a preset significance level (normally at 95%). Kolmogorov-Smirnov tests have been used in the prior art to detect cuts from videos. See I. K. Sethi et al., A Statistical Approach to Scene Change Detection, SPIE Vol. 2420, Storage and Retrieval for Image and Video Databases III, pp. 329–338, 1995. A single pre-selected significance level ignores the non-stationary nature of the cut detection problem. Accordingly, the modified Kolmogorov-Smirnov test accounts for the non-stationary nature of the problem by automatically adjusting the significance level to different types of video contents. For example, one way to represent video content is to use measurements in the spatial and the temporal domains together. Image contrast is a good spatial domain measurement because the amount of intensity changes across two neighboring frames measures video content in the temporal domain. As image contrast increases, cut detection sensitivity should be increased, and as changes occurring in two consecutive images increase, cut detection sensitivity should be decreased.

The traditional Kolmogorov-Smirnov test also cannot differentiate a long shot from a close up of the same scene. To guard against such transitions, the modified Kolmogorov-Smirnov test uses a hierarchical method where each frame is divided into four rectangular regions of equal size and a traditional Kolmogorov-Smirnov test is applied to every pair of regions as well as to the entire image. The modified Kolmogorov-Smirnov test produces five binary numbers that indicate whether there is a change in the entire image as well as in each of the four sub-images. Instead of directly using these five binary numbers to eliminate false positives, the test results are used qualitatively by comparing the significance of a shot change frame against that of its neighboring frames.

Examples of a cut detection methods which employ the cut detection methods described above are described in copending U.S. patent application Ser. No. 08/576,271 entitled CUT BROWSING AND EDITING APPARATUS filed on Dec. 21, 1995 and copending U.S. patent application Ser. No. 08/576,272 entitled APPARATUS FOR DETECTING A CUT IN A VIDEO filed on Dec. 21, 1995. Both applications are incorporated herein by reference. It should be noted that although the automatic cut detection methods described above are preferred, other suitable automatic cut detection methods and algorithms can also be used in the system.

After the raw frames of the video are automatically organized into shots, the browser interface enables a user to view the shots of the shot-list. The browser interface displays the video to the user in the form of a composite image which makes the shot boundaries, automatically detected by the cut detection method, visually easier to detect. The composite image is constructed by including a horizontal and a vertical slice of a single pixel width from the center line of each frame in the video along the time axis.

Figure 5A:
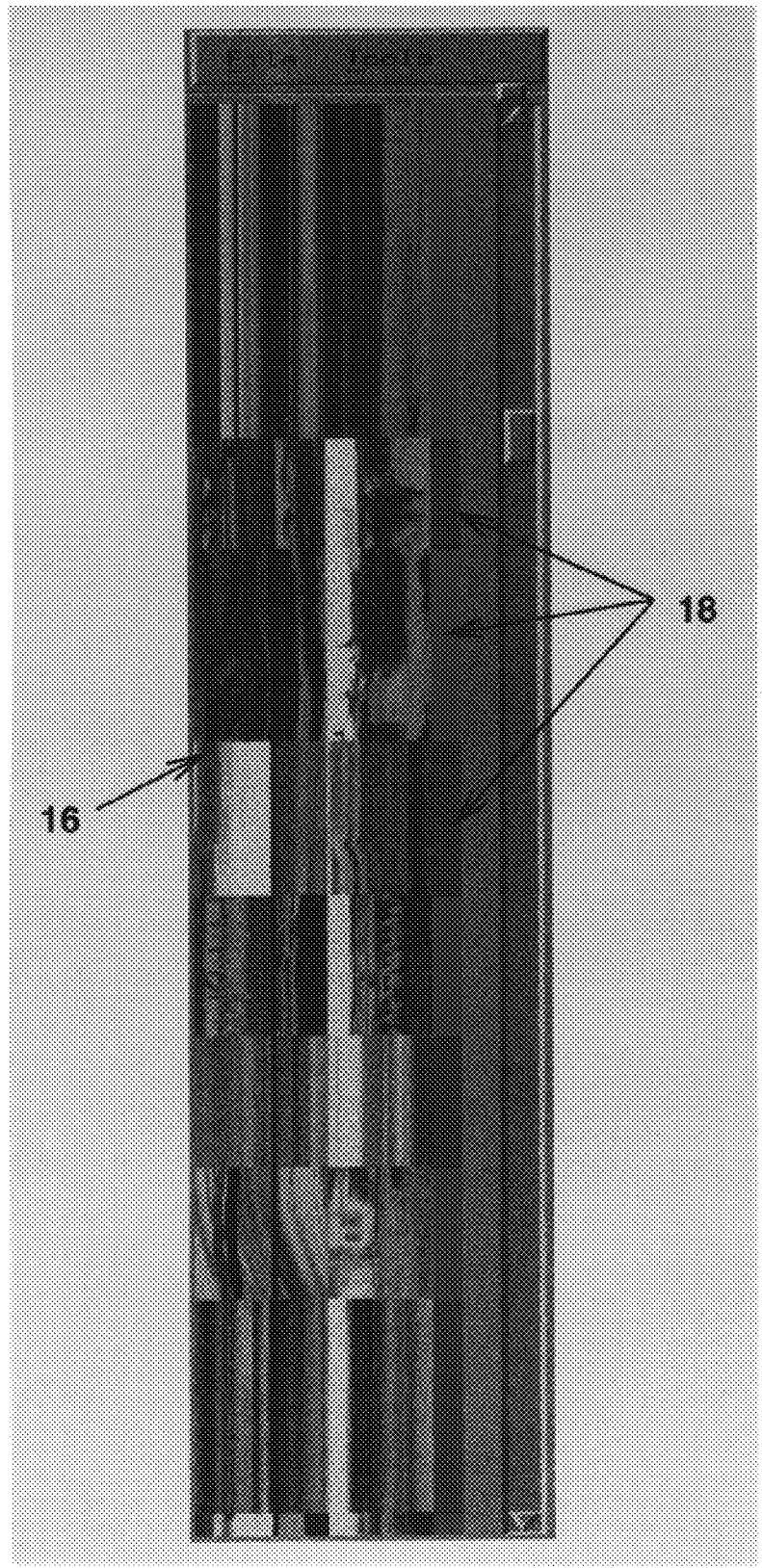
FIG. 5A depicts a composite image displayed by the browser interface.

FIG. 5A depicts a composite image 16 displayed by the browser interface. Shots are visually depicted by colored bars 18 in the browser interface, allowing easy checking of shot boundaries.

Automatic shot boundary detection may produce unsatisfactory results in the case of slow wipes from one shot to the next, momentary changes in illumination (flashes), high activity in the frames, zooms, and the like. Changes may also be necessary in the automatically generated shot-list. For example, additional shots may have to be added to the shot-list or two shots may have to be merged into one. Any changes made in the shot boundaries will change the shot-list and the set of icon images depicting the shots. Accordingly, the browser interface also enables a user to edit the shots by providing a number of operations which allow the shot boundaries to be modified by the user. These operations are referred to as split, split ahead, merge, and play video.

A split operation involves marking a point of split in a shot and splitting the shot into two shots. Icon images representing the two shots are produced and the internal shot structure of the browser interface is updated. The split is used to detect shots which were not detected automatically with the cut detection method.

Figure 5B:
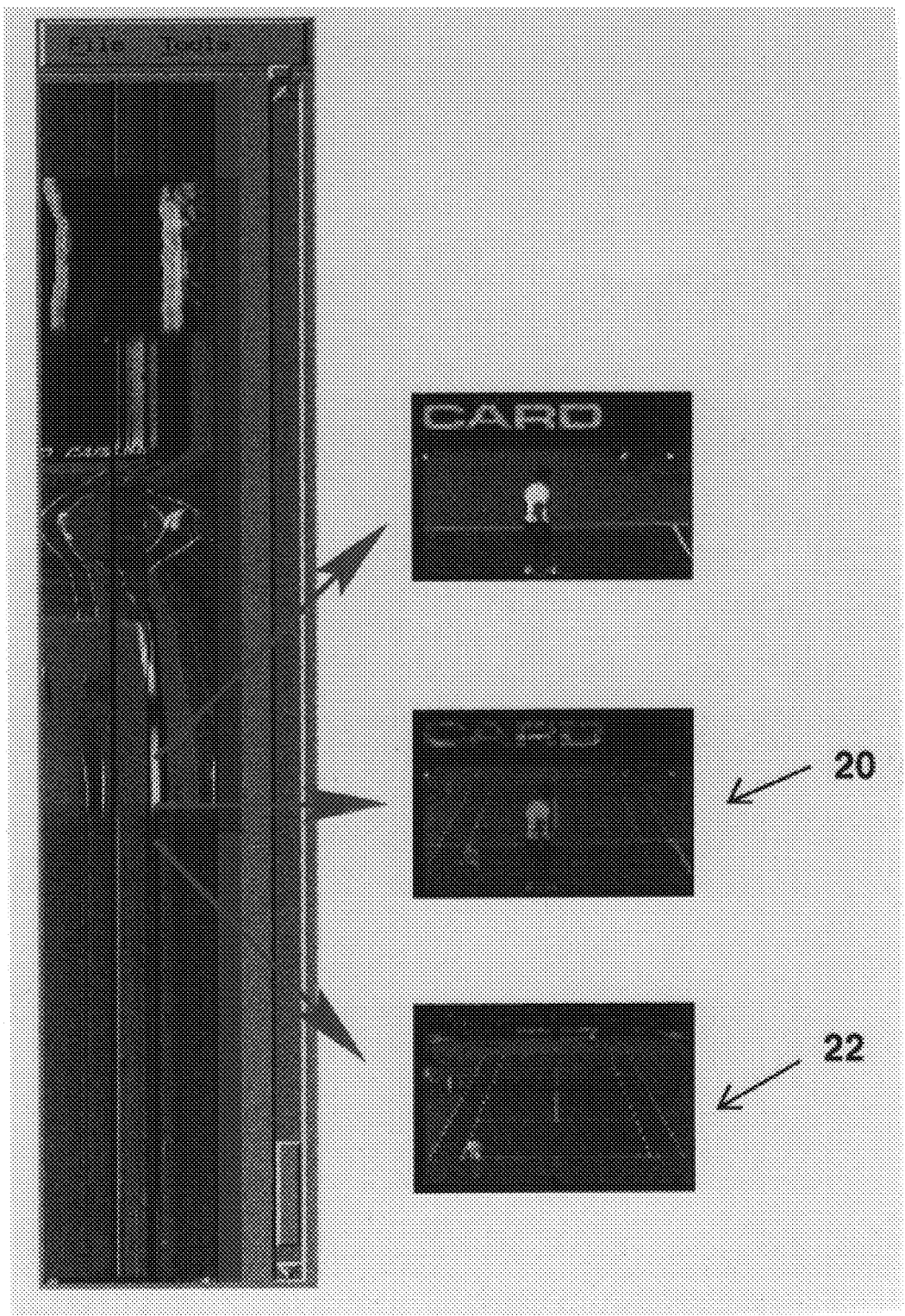

A split ahead operation is used in gradual shot changes, where one shot fades into another (in a transition region) making it difficult for a user to locate the point where the shot should be split to get a good quality representative icon from the new shot created. In a split ahead, any point selected in the transition region produces a correct split. The point where the transition is completed is detected by processing the region following the point selected by the user. FIGS. 5B and 5C demonstrate how a split ahead is processed. FIG. 5B shows a middle icon image 20 with a frame number (5138) selected by the user based on visual inspection of the shot boundary displayed in the browser interface. This image does not represent the next shot as it still contains an overlap from the earlier shot. The last icon image 22 has a frame number (5148) correctly picked by the split ahead operation. This is achieved using a smoothed intensity plot as shown in FIG. 5C. The transition point is identified by following the gradient along the smoothed intensity plot until the gradient direction changes or the gradient becomes negligible.

A merge operation is used to merge two adjoining shots into one. There are two types of merge operations: a merge back and a merge ahead. These operations are used for merging a shot with a previous or next shot. The shot to be merged is specified by selecting any frame within it. The image icon representing the merged shot is deleted by this operation.

A play video operation allows the actual video to be played on the video player interface from any selected video frame. Video playback may be needed to determine the content of the shots and detect subtle shot boundaries. While the video is playing, the browser interface may track the video to keep the frame currently playing at the center of the viewing area.

The browser interface can store a modified shot-list containing the changes made by the user. The user can also trigger the automatic clustering of shots in the shot-list from the browser interface, to produce a merge-list which is used by tree view interface as will be explained further on.

Once the shot boundaries have been corrected with the browser interface, the automatic shot grouping method groups the shots into stories, sub-plots, and further sub-plots, which reflect the structure present in the video. Organization of shots into a higher level structure is more complex since the semantics of the video has to be inferred from the shots detected in the video. The automatic shot grouping method determines the similarity between the shots and the relevance of the repetition of similar shots, by comparing their representative frame image icons generated during shot boundary detection. This involves determining whether two images are similar. The automatic shot grouping method uses a color method to cluster the shots into initial groups, and then uses a method which uses edge information within each group to refine the clustering or grouping results.

The color method used for clustering shots into initial groups is based on a name-based color description system. A suitable name-based color description system is described by K. L. Kelly et al., The ISCC-NBS Method of Designating Colors and A Dictionary of Color Names, National Bureau of Standards Circular 553, Nov. 1, 1955. The Kelly et al. ISCC-NBS color system is incorporated herein by reference. The ISCC-NBS color system described by Kelly et al. divides Munsell color space into irregularly shaped regions and assigns a color name to each region based on human perception of color and common usage. The ISCC-NBS system allows color histograms to be used for automatic shot grouping without concern for how color space is quantized and in modified form, allows a color description to be constructed independent of the illumination of a scene. Since the color names are based on common usage, the results are more likely to agree with a user's perception of color similarity. The other advantage of using a name-based system is that it allows development of user interfaces using natural language descriptions of color.

Each color name in the NBS system has two components: a hue name and a hue modifier. FIG. 6A shows a list of hue names used in the NBS system, and FIG. 6B shows the hue modifiers used, e.g. "very deep purplish blue" is a possible color name. However, all combinations of hue name and modifiers are not valid names. There are a total of 267 valid color names, obtained by dividing Munsell color space into irregularly shaped regions. The conversion from the Munsell color space to the color name are described in exhaustive tables and is purely based on observations, as no conversion formulae are available.

A modified ISCC-NBS system is used in the present invention to maintain the description of an image independent of its illumination. In the modified NBS system, only the hue names are used instead of the full color names. This modification substantially improves the accuracy of clustering, as two similar images are more likely to be clustered in the same group. In addition, white and black are used to describe certain colors instead of the actual hue names. Without this modification, unexpected classifications of color have been observed. For example, the use of the color name "green" with the modifier of "very pale" results in "very pale green" which is actually closer to white than green. Similarly "very dark green" is closer to black than green. An "indeterminate" hue label is also used for colors with the modifier "grayish". The number of colors are also reduce to 14, by merging some of the colors into their more dominant component. For example, "reddish orange" is considered to be "orange".

Figure 7A:
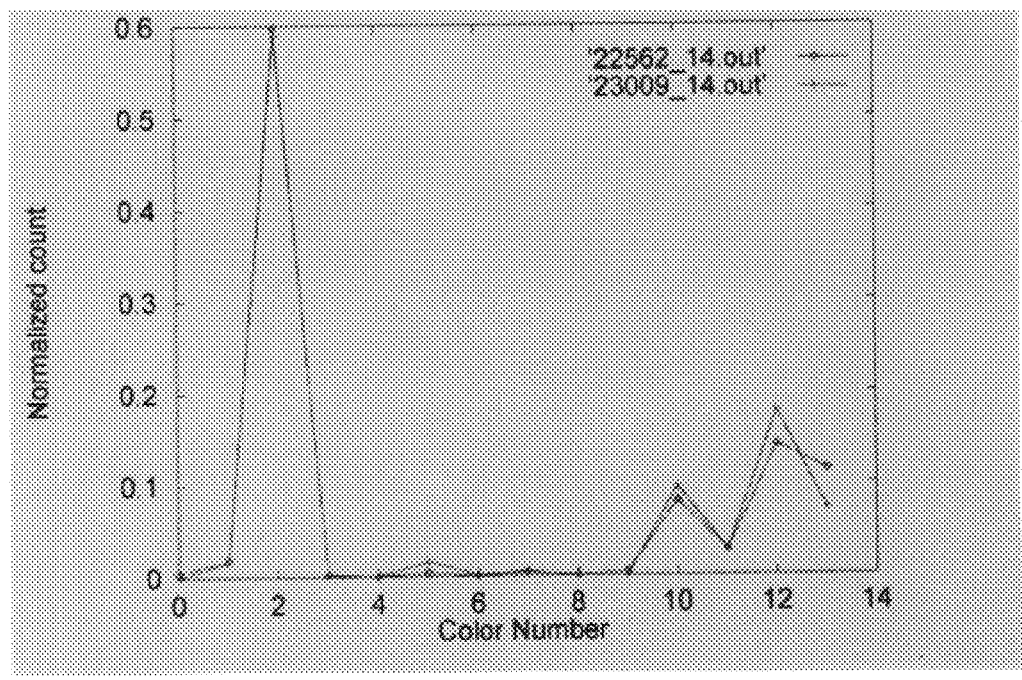
FIGS. 7A and 7B are histograms obtained from two images of a soccer match which demonstrate how reducing the number of colors in the present invention increases the likelihood of two similar images being clustered in the same group.
Figure 7B:
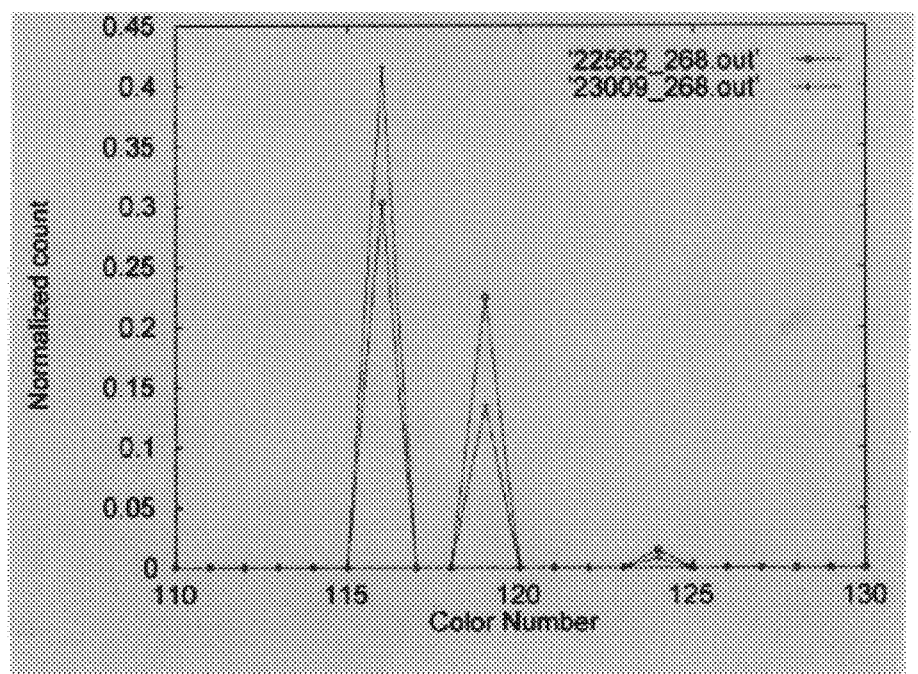

FIGS. 7A and 7B are histograms obtained from two images of a soccer match which demonstrate how reducing the number of colors increases the likelihood of two similar images being clustered in the same group. The grass color of the soccer field varies in the shade or type of green along the field. Consequently, the color of the soccer field in each image is of a different shade or type. The histograms of FIG. 7A were generated using the modified list of 14 colors while the histograms of FIG. 7B were generated using the all the standard hue names. Using the modified list of 14 colors, all types of green are labeled "green" (color number 2) therefore, the histograms of FIG. 7A are very similar. However, when all hue names are used, the green label is divided into "olive green", "yellowish green", "bluish green", etc. The histograms of FIG. 7B appear different since the proportions of the different shades of green are not the same in the two images.

Figure 8:
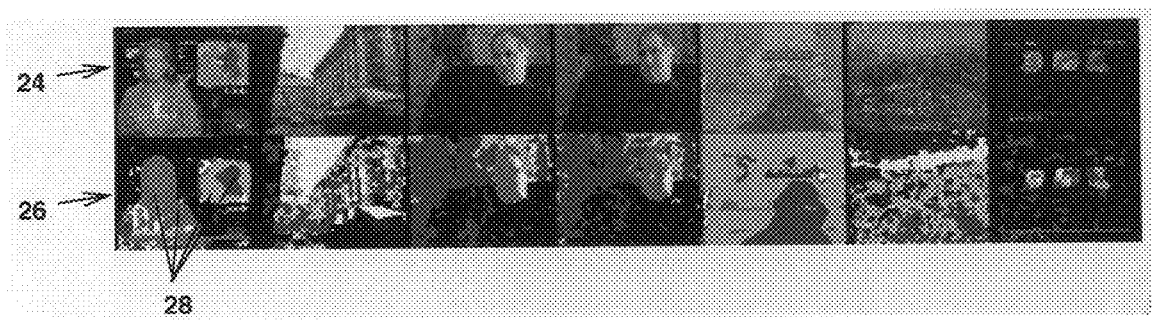
FIG. 8 are images labeled with the 14 modified colors of the present invention.

FIG. 8 are images labeled with the 14 modified colors. The top row 24 depicts the original images and the lower row 26 depicts the images labeled with the 14 modified colors 28.

Figure 9A:
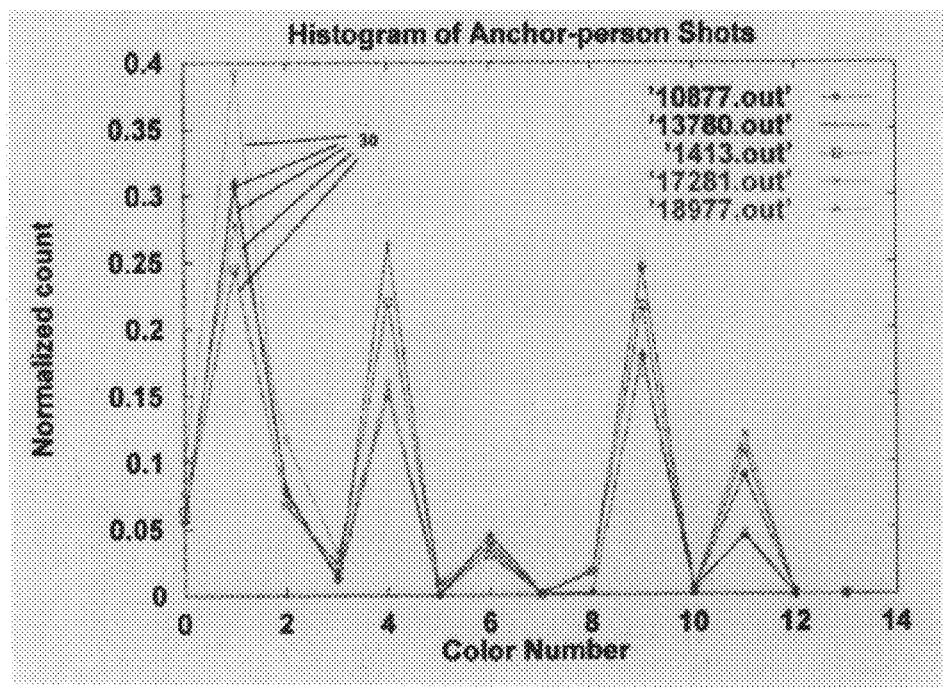
FIG. 9A shows the color histograms of anchor-person shots grouped together based on their similar color distributions according to the present invention.
Figure 9B:
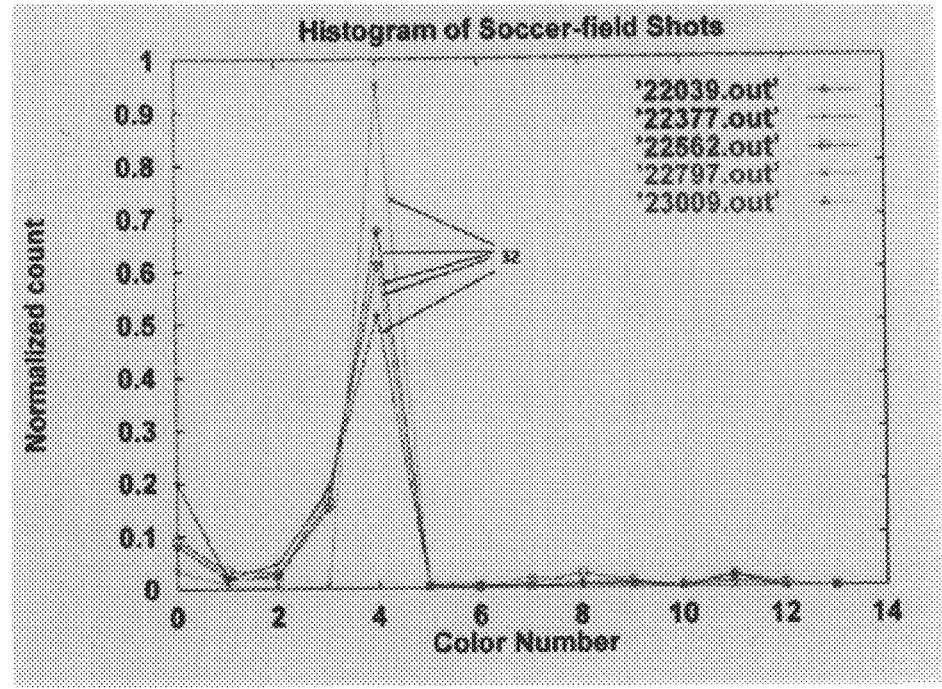
FIG. 9B shows the color histograms of soccer field shots grouped together based on their similar color distributions according to the present invention.

After labeling the images with the 14 modified colors, normalized histogram bin counts are used as feature vectors to describe the color content of an image. FIG. 9A shows the color histograms 30 of anchor-person shots grouped together based on their similar color distributions and FIG. 9B shows the color histograms 32 of soccer field shots grouped together based on their similar color distributions.

Once the shots are clustered into initial groups, edge information is used as a filter to remove shots incorrectly grouped together based on color. This may occur because of the limited number of colors used and the tolerances are allowed when matching histograms. Thus, visually dissimilar images with similar color distributions may be grouped together.

Filtering is accomplished by classifying each edge pixel to one of four cardinal directions based on the sign and relative magnitude of the pixel's response to edge operators along x and y directions. The histogram showing pixel counts along each of the four directions is used as a feature vector to describe the edge information in the image. This gives gross edge information in the image when the image is simple. The image is simplified by quantizing it to a few levels (4 or 8), using a quantizer and converting the quantized image to an intensity image. Image quantizing using color quantizers is discussed in an article by X. Wu, Color Quantizer v. 2, Graphics Gems, Vol. II, pp 126–133. This information is sufficient to filter out substantially all of the false shots in a group.

Figure 10A:
FIGS. 10A–10C demonstrate quantization according to the present invention.
Figure 10B:
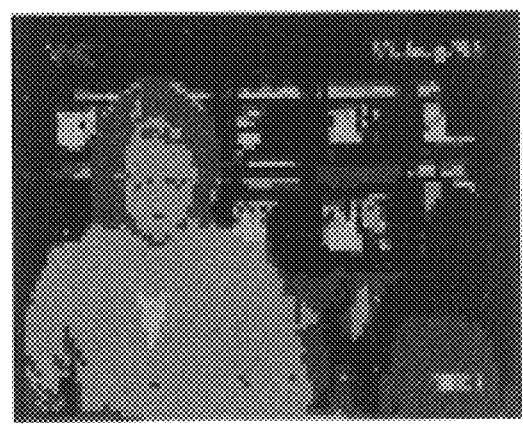
Figure 10C:
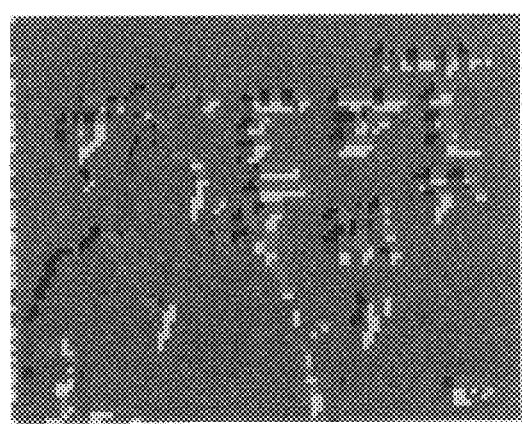

FIGS. 10A–10C demonstrate quantization. FIG. 10A depicts an original image prior to quantizing. FIG. 10B, depicts the image after it has been quantized and FIG. 10C, depicts the edge pixels of the image.

The choice of clustering strategy is limited by having no a priori knowledge of the number of clusters or assumptions about the nature of the clusters. It can not be assumed that similar images will be temporally close to each other in the video, since the repeating shots are likely to be scattered throughout the video. Therefore, prior art clustering strategies which involve comparisons among all possible elements in a limited window are not suitable. The number of potential clusters a priori is not known, so known K-means clustering and other strategies using this a priori information are also not useful.

Moreover, it would be advantageous if the clustering strategy is not off-line i.e., did not require all the shots to be present before starting. This allows the shots to be processed as they are generated.

The preferred shot grouping method is based on nearest neighbor classification, combined with a threshold criterion. This method satisfies the constraints discussed above, where no a priori knowledge or model is used. The initial clusters are generated based on the color feature vector of the shots. Each initial cluster is specified by a feature vector which is the mean of the color feature vectors of its members. When a new shot is available, the city block distance between its color feature vector and the means or feature vectors of the existing clusters is computed. The new shot is grouped into the cluster with the minimum distance from its feature vector, provided the minimum distance is less than a threshold. If an existing cluster is found for the new shot, the mean (feature vector) of the cluster is updated to include the feature vector of the new shot. Otherwise, a new cluster is created with the feature vector of the new shot as its mean. The threshold is selected based on the percentage of the image pixels that need to match in color, in order to call two images similar.

During post-processing of the color-based generated initial clusters, shots are deleted from the cluster if the distance of their edge feature vector from the mean edge vector of the group is greater than a threshold, starting with the shot furthest from the mean edge vector. The mean edge vector is recomputed each time a member is deleted from the cluster. This is continued till all the edge feature vectors of the members in the cluster are within the threshold from the mean edge vector of the cluster, or there is a single member left in the cluster. The threshold is a multiple of the variance of the edge vectors of the cluster members. Consequently, the final clusters are based on color as well as edge similarity, allowing the color feature to be the main criterion in determining the clusters.

A merge-list is produced by the automatic clustering which identifies a group number for each shot in the shot-list. Other features may also be used to produce the clusters, including audio similarity. The merge-list is used for automatically constructing the tree structure or VTOC.

Figure 11:
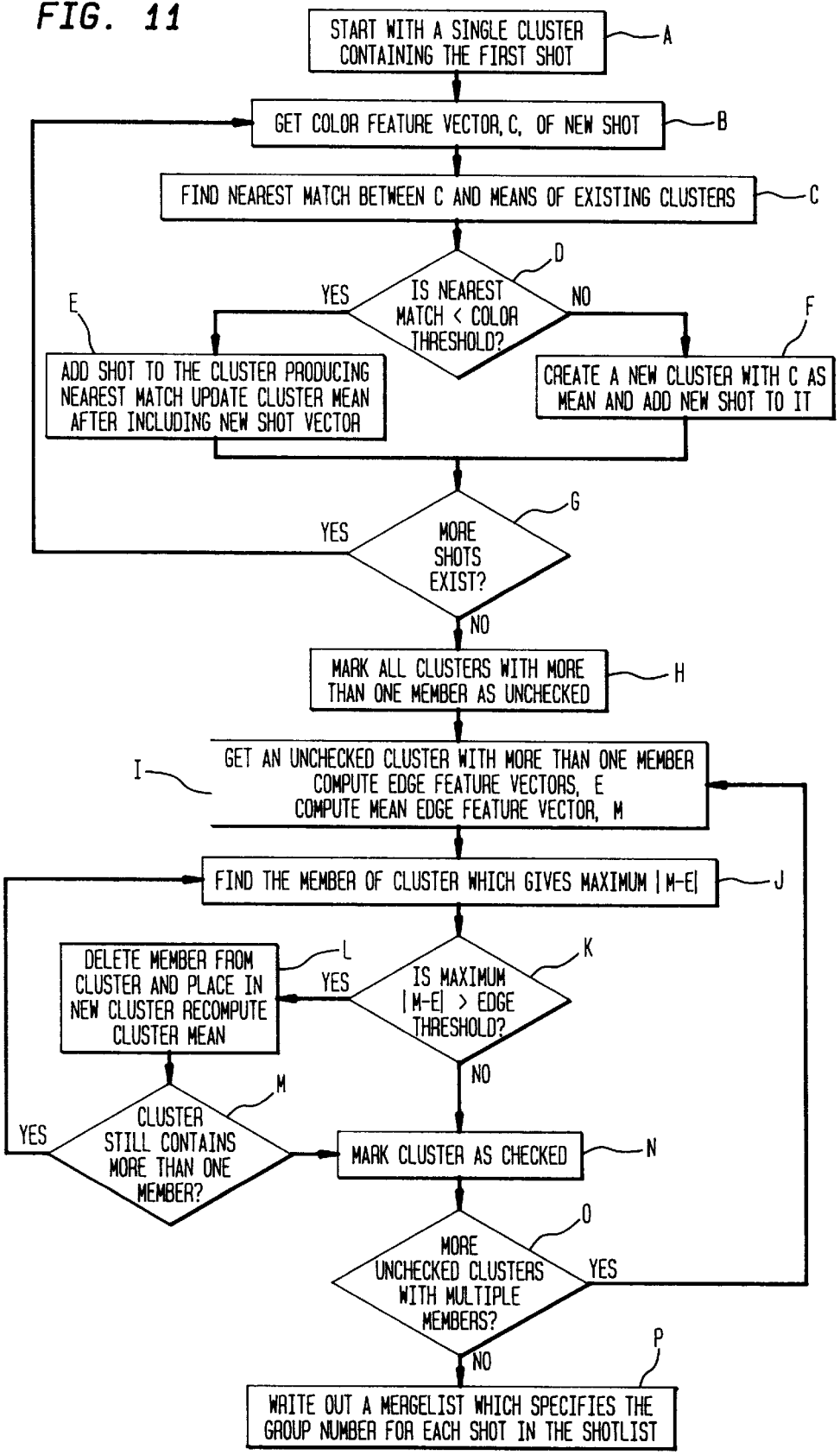
FIG. 11 is a flow chart setting forth the steps performed by the shot grouping method of the present invention.

FIG. 11 is a flow chart setting forth the steps performed by the shot grouping method described above. In step A, the method commences with a single cluster containing a first shot. In step B, the color feature vector, C, of a new shot is obtained. In step C, the nearest match between C and means of existing clusters is found. In step D, if the nearest match is less than the color threshold, then in step E, a shot is added to the cluster producing the nearest match and the cluster mean is updated after including the new shot vector. If the nearest match is not less than the color threshold then in step F, a new cluster with C as mean is created and the new shot is added to it. Then from either step E or step F, it is determined whether more shots exist in step G. If so, then the method starts over at step B. If no more shots exist, then in step H, all clusters with more than one member are marked as unchecked; these clusters are checked using edge information in the following steps. In step I, an unchecked cluster with more than one member is found; then the edge feature vectors, E for each member, are computed, and the mean edge feature vector M for the cluster is also found. In step J, the member of the cluster which gives a maximum absolute value for (M–E) is obtained. In step K, it is checked if the maximum absolute value for (M–E) is greater than the edge threshold. If the test in step K is true, then in step L the member is deleted from the cluster and placed in a new cluster and the cluster mean is recomputed and, if step M shows that the cluster still contains more than one member, the method returns to step J, else it goes to step N. If the test in step K is false, then the method goes to step N where the cluster is marked as checked. In step O, it is tested whether there are more unchecked clusters. If yes, the method goes to step I, otherwise in step P, a merge-list is written out which specifies a group number for each shot in the shot-list.

The merge-list generated by the automatic shot grouping method is used for generating the tree structure. The tree structure captures the organization of the video and is easy for users to understand and work with. In the tree structure, a whole video is a root node that can have a number of child nodes each corresponding to a separate "story" in the video. Each story node can have further children nodes corresponding to sub-plots in the story and the sub-plots may be further sub-divided and so on. A story is a self-contained unit which deals with single or related subject(s). Sub-plots are different elements in a story unit or sub-plot unit. The tree structure has different types of nodes, the type of node providing semantic information about its contents. Each node also has a representative icon, allowing browsing without having to unravel the full structure. Each new story starts with a story node (main branch node) consisting of sub-plot nodes (secondary branch nodes) for each sub-plot. Similar nodes are used to bind together all consecutive frames found to be in the same group by the automatic shot grouping method. Frequently, these nodes may be replaced by any one of its members by merging the other shots. Leaf nodes are the final nodes on the main and secondary branch nodes. The leaf nodes contain the shots from the shot-list.

Figure 12:
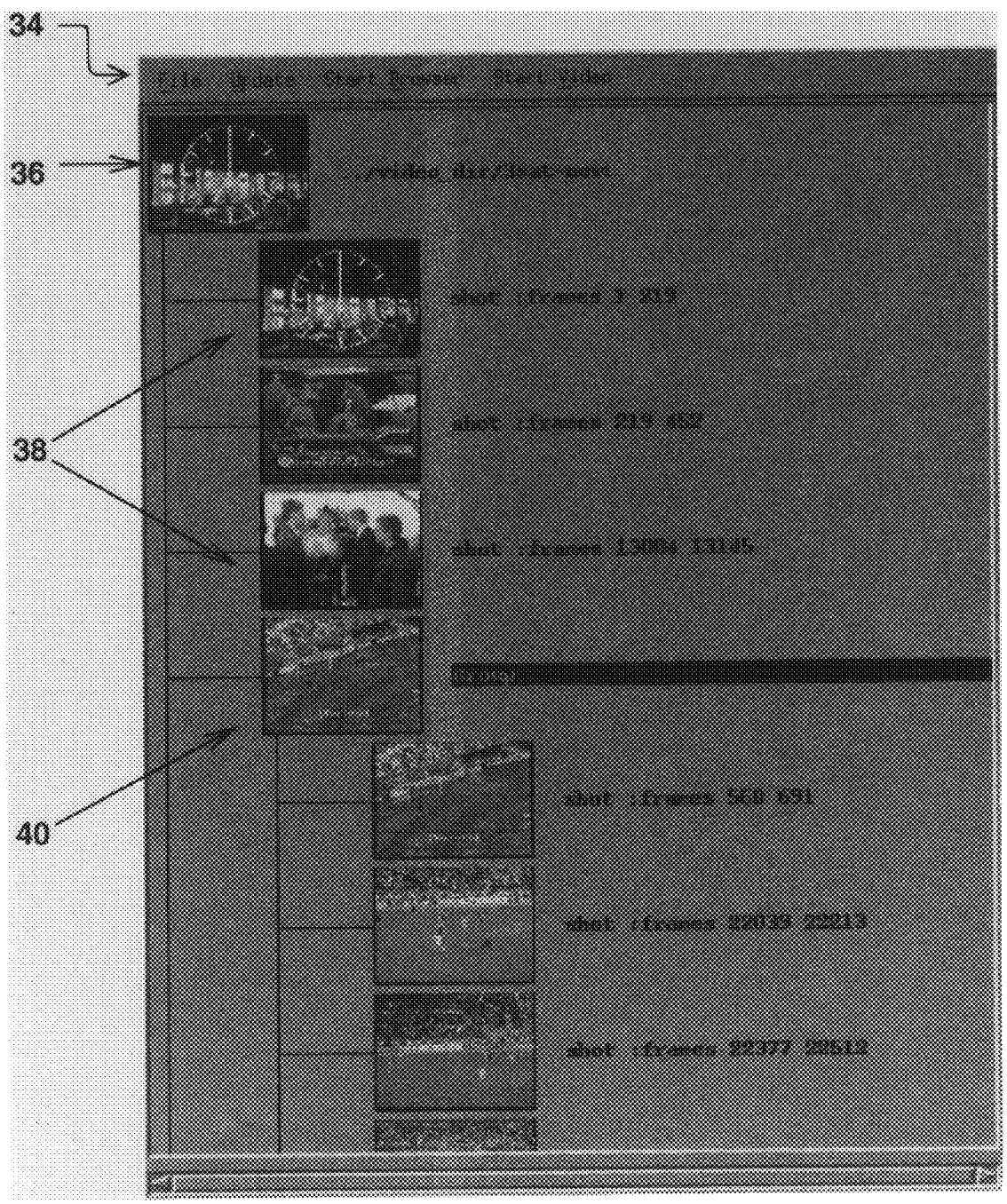
FIG. 12 depicts a group structure displayed by the tree view interface.

The tree view interface allows a user to view and modify the shot groups generated by the automatic shot grouping method. FIG. 12 depicts a group structure 34 displayed by the tree view interface. At this point of video organizing, there are only two types of nodes 38, 40 attached to the root node 36. If the group contains a single member, the member shot is attached as a leaf node to the root. For groups containing more than one member, an intermediate group node is attached, which contains the member shots as its children. The tree view interface allows a user to move shots out of groups, move shots into existing groups or create new groups using operations which will be explained further on. A modified merge-list can also be generated which reflects the changes made by the user. Since the tree structure is constructed from the merge-list, the shot groups must be modified before the tree structure is loaded.

After correcting the results of the automatic shot grouping method, the tree structure can now be automatically generated. The preferred method used for generating the tree structure contains two major functions. One of these functions is referred to as the "create-VTOC-from-merged-list function" and the other function is referred to as the "find-structure" function. The create-VTOC-from merged-list function uses a method which finds all the story units, creates a story node for each story unit and initiates the find-structure function to find structure within each story. In the create-VTOC-from-merged-list function used in the present invention, each story unit extends to the last re-occurrence of a shot which occurs within the body of the story. The "find-structure" function takes a segment of shot indices, traverses through the segment to create a node for each shot until it finds one shot that reoccurs later. At this point, find-structure function divides the rest of the segment into sub-segments each of which is lead by the recurring shot as a sub-plot node and recursively calls itself to process each sub-segment. If consecutive shots are found to be similar, they are grouped under a single similar node. The structure produced by the find-structure function is attached as a child of the story node for which it was called.

Figure 13A:
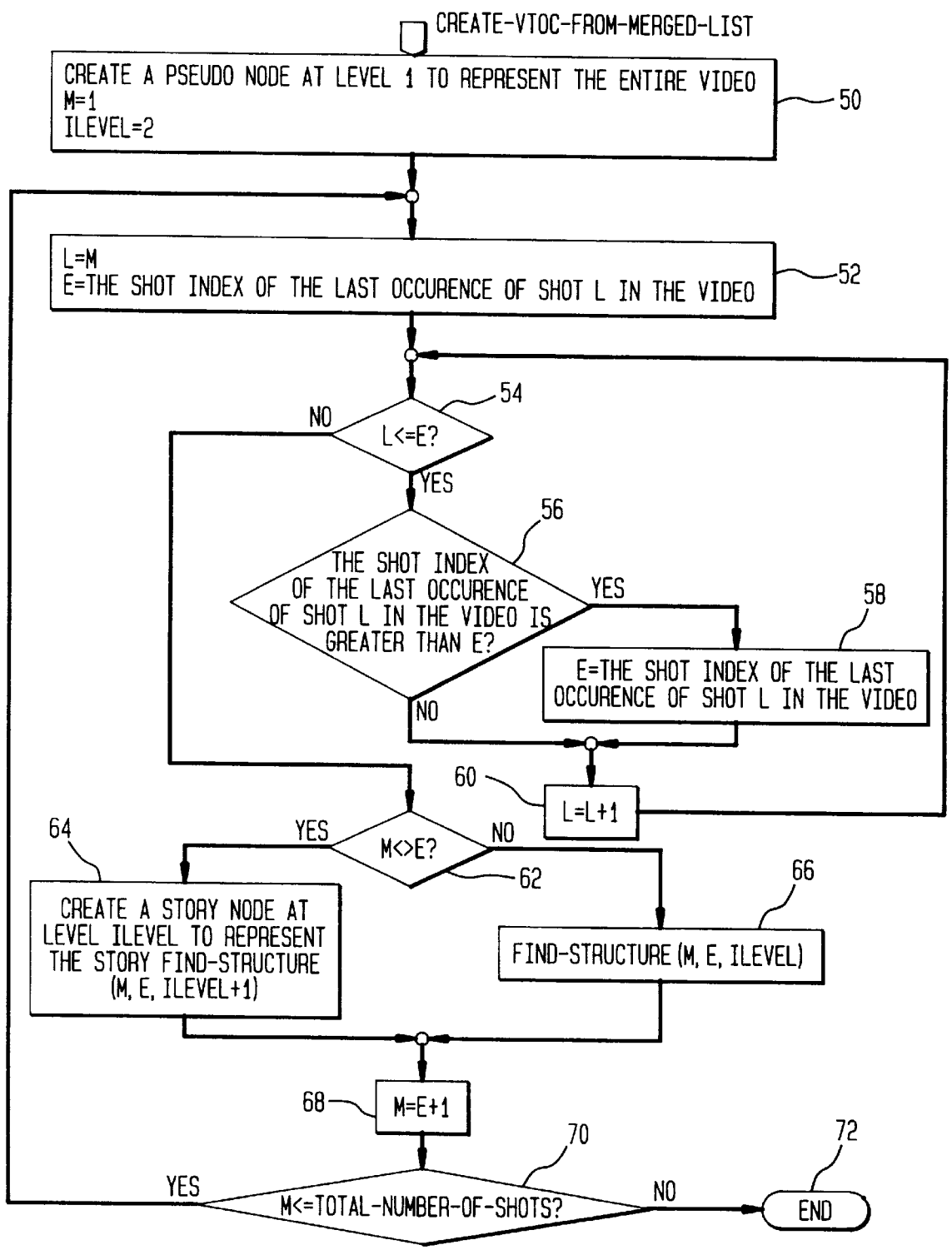
FIGS. 13A and 13B are flow charts setting forth the steps performed by the method which generates the hierarchical tree structure.
Figure 13B:
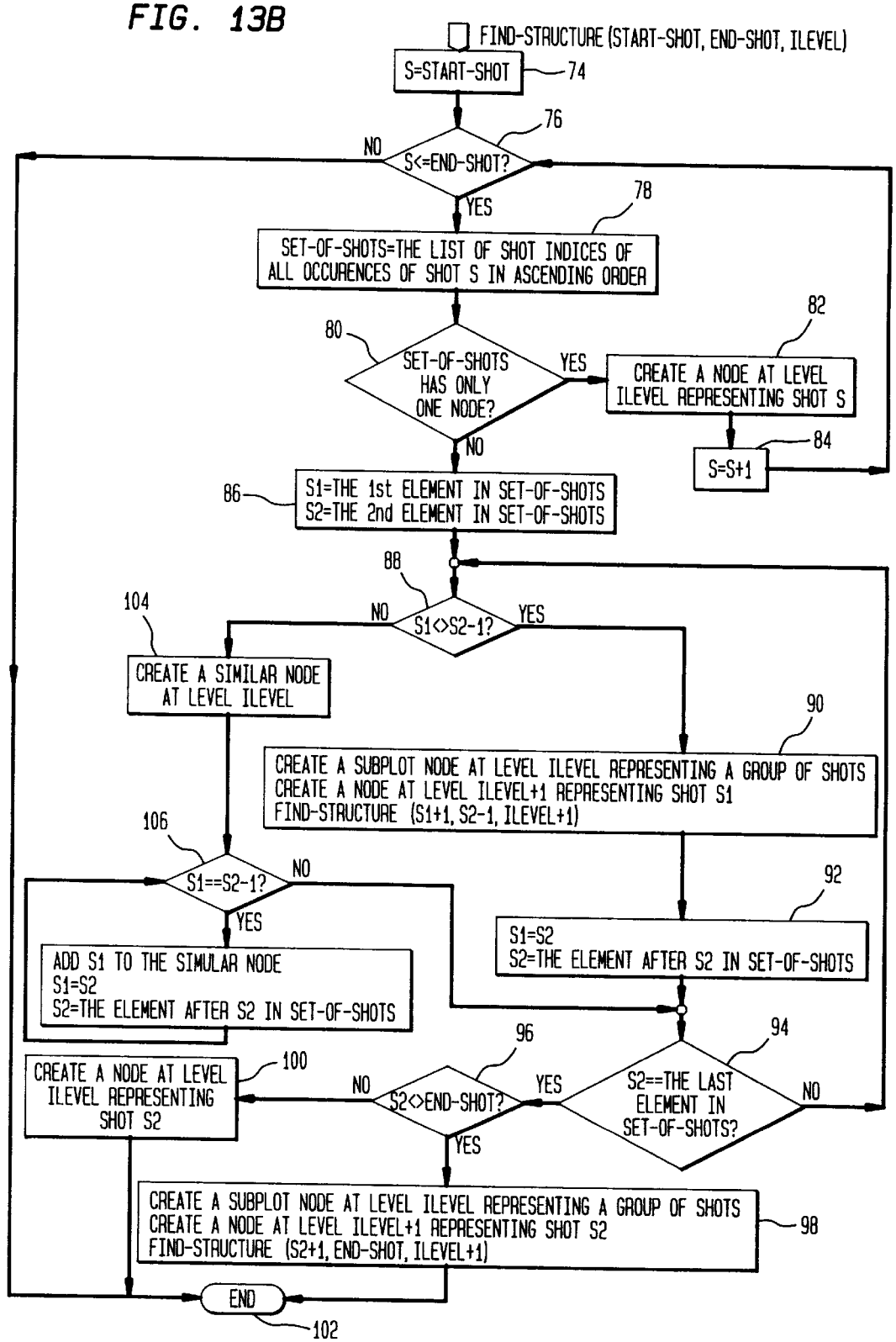

FIGS. 13A and 13B are flow charts detailing the steps described above. FIG. 13A depicts the create-VTOC-from-merged-list portion of the method. In step 50, a pseudo or root node at the first level of the hierarchical structure is created to represent the entire video, shot index M is defined and assigned the value of 1, and the current level of the hierarchical structure, designated ILEVEL, is assigned a value of 2. The story units are found in the shot groups using shot indices L and E in step 52. Since each story unit extends to a last re-occurrence of a shot occurring in the story unit, index L is set to index M, and index E is set to the shot index of the last occurrence of shot L in the video. If L is less than or equal to E in step 54, the method determines whether the shot index of the last occurrence of shot L in the video is greater than E in step 56. If it is, E is set to the shot index of the last occurrence of shot L in the video, in step 58, L is set to L+1 in step 60, and the method then returns to step 54 and processes L+1. However, if L is not less than or equal to E in step 54, then the method determines if a story has been found in step 62 by determining whether index M is greater than or less than index E. If index M is greater than or less than index E, then a story node at level ILEVEL is created in step 64 to represent a found story, and the find-structure portion of the method (described below) is called up to find the structure within each story by processing index M, E, and ILEVEL+1. If no story is found in steps 52, 54 and 62, then no node is created and the find-structure portion of the method is executed to find structure in any existing stories by processing index M, E, and ILEVEL. After steps 64 or 66, index M is set to E+1 in step 68 and then it is determined if there are additional shots to process in step 70. If additional shots are present, step 52 is executed. If no more shots need processing then the method stops at step 72.

FIG. 13 B depicts the find-structure portion of the method. The find-structure portion of the method receives a segment of shot indices (START-SHOT, END-SHOT, ILEVEL) and traverses through the segment to create a node for each shot until it finds one shot that reoccurs in the segment. The find-structure portion can be determined by providing a variable S for the shots and setting S to START-SHOT in step 74 and determining whether shot S is less than or equal to the end shot in step 76. If S is less than or equal to the END-SHOT then, SET-OF-SHOTS is set to the list of shot indices of all occurrences of shot S in ascending order in step 78. If S is not less than or equal to the end shot, the method ends at step 102. Then in step 80, it is determined whether the SET-OF-SHOTS has only one node (only one similar shot). If the SET-OF-SHOTS has only one node (no reoccurring shot is found), a node at level ILEVEL representing shot S is created in step 82 and S is set to S+1 in step 84. If, however, the SET-OF-SHOTS has more than one node, one or more reoccurring shots are in the segment. At this point the rest of the segment is divided into sub-segments by setting S1 to the 1st element in the SET-OF-SHOTS and setting S2 is set to the second element in the SET-OF-SHOTS in step 86. The sub-segments are each identified by one of the found reoccurring shots as a sub-plot node by determining whether S1 and S2−1 are the same (whether consecutive shots are similar) in step 88, and creating a subplot node at level ILEVEL representing a group of shots in step 90 if S1 and S2−1 are not the same. A node at level ILEVEL+1 representing shot S1 is also created, and the method recursively calls itself to process S1+1, S2−1, and ILEVEL+1. Then in step 92, S1 is set to S2, where S2 is set to the element after S2 in the SET-OF-SHOTS. In step 94, it is determined whether S2 is the last element in the SET-OF-SHOTS. If it is not, then the method returns to step 88 and continues through the steps 90, 92 and so forth. If S2 is the last element in the SET-OF-SHOTS, then in step 96, it determined whether S2 is the END-SHOT. If S2 is not the last element in the SET-OF-SHOTS, a subplot node at level ILEVEL representing another group of shots is created, a node at level ILEVEL+1 representing shot S2 is created and the method recursively processes S2+1, END-SHOT, and ILEVEL+1. If S is the END-SHOT, then in step 100, a node at level ILEVEL representing shot S2 is created. At the conclusion of steps 98 or 100, the method ends at step 102. Returning again to step 88, if consecutive shots are similar, a similar node at level ILEVEL is created in step 104 and similar shots are grouped together under the similar node in steps 106 and 108. Once similar shots are processed, step 94 is executed. The structure produced by the find structure portion of the method, is attached as a child node of the story node for which the find structure function was called.

Figure 14:
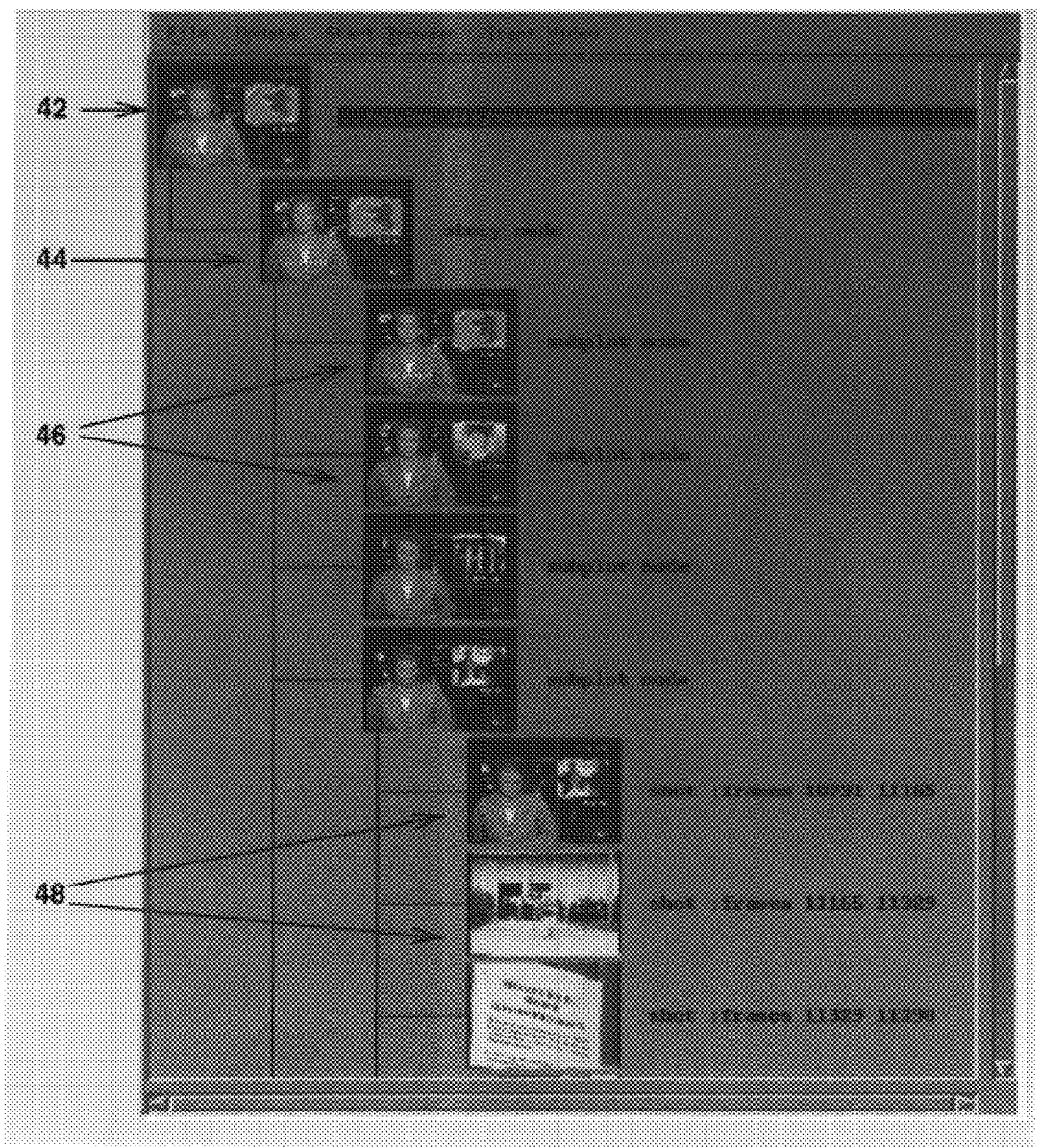
FIG. 14 is a tree structure displayed by the tree view interface.

Although the tree view interface allows a user to view and modify the shot groups generated by the automatic shot grouping method, its primary function is to enable the user to view and modify the tree structure description of the video generated from the merge-list by the tree structure generating method. FIG. 14 is a tree structure displayed by the tree view interface. Note that each node has a representative icon, allowing browsing without having to unravel the full structure. The video is represented by a root node 42 and each story is represented with a story or main branch node 44. The subplots in each story is represented with a subplot or secondary branch node 46. Leaf nodes 48 contain the shots from the shot-list. The tree view interface gives the user full freedom in restructuring the tree structure to produce a meaningful video organization. Often, semantic information can be missed or misinterpreted by the method which automatically generates the tree structure. The tree view interface includes operations for moving, adding, deleting, and updating nodes. These operations facilitate changes in the tree structure. These operations are also provided when the tree view interface is used for editing the shot groups.

The node moving operation of the tree view interface allows a user to move nodes either one at a time or in groups. Node moving is a two-step process involving selecting one or more nodes to be moved and selecting a destination node. The moved node(s) are added as siblings of the selected destination node, either before or after (default choice) the destination node.

The add node operation allows a user to add new leaf nodes only through changes in the shot-list using the browser interface. However, all types of non-leaf nodes can be added to the tree. To avoid the creation of empty nodes, an existing node has to be selected to be a child of the new node created. A destination node also needs to be selected to specify the position where the new node is to be attached.

The delete node operation is an automatic operation. Leaf nodes can only be deleted through changes in the shot-list using the browser interface. Nodes with children cannot be deleted. All other (non-leaf) nodes are deleted automatically when they have no children.

The update operation uses cues from the user, e.g. when the user moves a shot (node) from one group to another group, to further reduce the effort which is needed to modify the automatic shot grouping results. The update operation first searches for whether image portions of two shots being merged by the user are similar. For example, in a news broadcast, each of the two shots may have an anchor person sitting at a desk with a TV in the background. However, the TV image portion of each shot may be different thereby indicating that the subject matter of the groups was not similar. Accordingly, partial match templates are then generated to block the TV image so that the system can look in all the remaining groups for nodes (shots) having an anchor person sitting at a desk with a TV in the background (TV image is blocked). Shots (nodes) found in the remaining groups with the anchor person/TV background image, are then automatically moved to the group where the shot moved by the user was placed.

If the update operation can not find any similar portions in the two merged shots it will compare the audio streams of the merged shots to determine if both are generated by the same speaker (person). For example, the news stories in a particular news program may not always start with an anchor person shot thus, two different shot groups may have been generated by the automatic shot grouping method. In this senario, audio streams of shots in all the remaining groups will be compared to see if they were produced by the same speaker. Shots (nodes) found in the remaining groups, having audio streams produced by the same speaker are then automatically moved to the group where the shot moved by the user was placed.

Finally, if the two shots merged by the user have completely different visual and audio features, the update operation will repeat the previous operation on all the siblings of the shot (node) which was selected for the previous operation. For example, if a sub-plot node is deleted by moving all its members to another sub-plot node, just one member needs to be explicitly moved. The other members will be moved with the update operation.

The user can invoke these operations to regroup the shots into more meaningful stories and sub-plots. The order of shots can also be changed from their usual temporal order to a more logical sequence. When used along with the Browser, all possible changes to the content and organization of the tree are supported.

The tree structure is stored as a tree-list file so that organized videos can display the tree structure without executing the processing steps again. Modifications made by the user in the tree structure are also saved in the tree-list.

As mentioned earlier, any one of the graphic user interfaces can be started first, provided the required files are present. A shot-list is needed to start the browser interface. The tree view interface starts with the group structure only if a merge-list is present, otherwise it starts with a tree structure stored in a tree-list.

There are a number of specific interactions involving the browser interface. The browser interface can produce a change in the shot-list. This information is provided to the tree view interface via a message and the change becomes visible immediately i.e., a new shot appears at the specified location or a shot gets deleted automatically. This helps the user to actually see the icons representing the shots that are being created or deleted. The visual information from the tree can be used to determine actions taken in the browser interface. For example, when two consecutive representative icons depicted by tree view interface cover a very similar subject matter, the user may choose to merge them even though a shot change is visible from the display of the browser interface. The user may also opt to reload the tree view interface using the new shot-list to edit the clustering, when there have been enough changes in the shot-list to make an earlier tree structure obsolete.

The tree view interface is associated with a number of interactions also. When changes are made in the order of the shots and the user wants to see these changes reflected in the browser interface, the user can opt to send a signal to the browser interface to reload the rearranged shot-list after saving it from tree view. Moreover, the video player interface can be played from the tree interface exactly as in the browser interface.

Figure 15:
FIG. 15 depicts a video displayed by the video interface.

Since the browser and tree view interfaces work with higher level representations of the video, the video player interface allows a user to view a video and its audio from any point in the video. The video player interface has the functionality of a VCR including fast forward, rewind, pause and step. FIG. 15 depicts a video displayed by the video interface.

It is understood that the above-described embodiments illustrate only a few of the many possible specific embodiments which can represent applications of the principles of the invention. Hence, numerous modifications and changes can be made by those skilled in the art without departing from the spirit and scope of the invention.

What is claimed is:

1. A system for interactively organizing and browsing raw video to facilitate browsing of video archives, comprising:
   automatic video organizing means for automatically organizing a raw video into a hierarchical structure that depicts the video's organized contents, said automatic video organizing means including shot grouping means for automatically grouping shots, which represent a continuous action in time and space, into groups of visually similar shots, each group of shots capturing a given structure in the raw video; and
   user interface means for allowing a user to view and manually edit the hierarchical structure, said user interface means including tree view interface means for allowing the user to view the groups of visually similar shots, create new groups of visually similar shots, and modify the groups of visually similar shots, said tree view interface means including update means for determining whether any image portions of a shot merged with another shot by the user are similar, wherein when said update means finds similar image portions, said update means generates partial match templates which blocks dissimilar image portions of remaining shots and automatically merges the remaining shots that have similar image portions, wherein when said update means does not find any similar image portions, said update means determines whether audio streams of the two merged shots are similar, wherein when said update means finds similar audio streams, said update means searches other shots in the groups for similar audio streams and automatically merges other shots with similar audio streams together, wherein when said update means does not find any similar audio streams in the two merged shots, the update means repeats the user's action on all siblings of the merged shot.

2. The system according to claim 1, wherein the automatic organizing means includes shot detecting means for automatically detecting abrupt scene changes in raw frames of the video and automatically organizing the raw frames into a list of shots, each of the shots representing a continuous action in time and space.

3. The system according to claim 1, wherein the user interface means includes browser interface means for allowing the user to view the shots, add new shots to the list of shots, and merge the shots into a single shot.

4. The system according to claim 1, wherein the automatic organizing means includes hierarchical structure generating means for creating the hierarchical structure from groups of visually similar shots, each of the shots representing a continuous action in time and space.

5. The system according to claim 4, wherein the user interface means includes tree view interface means for allowing the user to view and modify the hierarchical structure to make the hierarchical structure substantially useful and meaningful to the user.

6. The system according to claim 1, wherein the user interface means includes video player means for allowing the user to play the video along with the video's audio from any point in the video.

7. A method used in automatically organizing video for automatically grouping shots into groups of visually similar shots, each group of shots capturing structure in a raw video, the shots generated by detecting abrupt scene changes in raw frames of the video which represent a continuous action in time and space, the method comprising the steps of:
   providing a predetermined list of color names;
   describing image colors in each of the shots using the predetermined list of color names;
   clustering the shots into visually similar groups based on the image colors described in each of the shots; and
   using image edge information from each of the shots to identify and remove incorrectly clustered shots from the groups.

8. The method according to claim 7, wherein the list of color names includes a plurality of hue names.

9. The method according to claim 7, wherein the step of describing includes the step of obtaining a color histogram for each shot based on the predetermined list of color names.

10. The method according to claim 9, wherein the step of describing further includes the step of normalizing bin counts of the color histograms to provide a feature vector which describes the image colors of the shots.

11. The method according to claim 7, wherein the step of clustering includes the steps of:
    providing a single one of the groups containing a first shot;
    getting a color feature vector of a new shot, the color feature vector based on the predetermined list of color names;
    finding a nearest match between the vector and group means of existing groups; and
    determining if the nearest match is less than a predetermined color threshold.

12. The method according to claim 11, wherein the step of clustering further includes the steps of:
    adding the new shot to a group producing the nearest match if the nearest match is less than the color threshold; and
    updating means of the group producing the nearest match.

13. The method according to claim 11, wherein the step of clustering further includes the steps of
    creating a new group with the color feature vector as its mean if the nearest match is not less than the predetermined color threshold; and
    adding the shot to the new group.

14. The method according to claim 7, wherein the step of using image edge information includes the steps of:
    computing edge feature vectors E for each shot of groups having more than one shot; and
    computing mean edge feature vector M for each group having more than one shot.

15. The method according to claim 14, wherein the step of using image edge information further includes the steps of:
    finding a shot of a group which gives a maximum absolute value for (M−E); and
    determining if the maximum absolute value for (M−E) is greater than a predetermined edge threshold.

16. The method according to claim 15, wherein the step of using image edge information further includes the steps of:
    deleting the shot of the group if the maximum absolute value for (M−E) is greater than the predetermined threshold and place the shot in a new group; and
    recomputing the mean edge feature vector of the group with the removed shot.

17. The method according to claim 16, further comprising the step of writing a merge-list which specifies a group number for each of the shots.

18. A method for interactively organizing and browsing video, the method comprising the steps of:
    automatically organizing a raw video into a hierarchical structure that depicts the video's organized contents, said step of automatically organizing including the steps of:
        automatically detecting abrupt scene changes in raw frames of the video,
        automatically organizing the raw frames into a list of shots, each of the shots representing a continuous action in time and space, and
        automatically grouping shots, which represent a continuous action in time and space, into groups of visually similar shots, each group of shots capturing a given structure in the raw video; and
    viewing and manually editing the hierarchical structure to make the hierarchical structure substantially useful and meaningful to the user, said step of viewing including the steps of:
        viewing the shots,
        manually editing the shots,
        viewing the groups of visually similar shots, and
        manually editing the groups of shots; and
    wherein the step of manually editing the groups of shots includes the step of determining whether any image portions of a first shot merged with a second shot by the user are similar, wherein when similar image portions are found, partial match templates are generated which block dissimilar image portions of remaining shots and automatically merges the remaining shots having image portions which are similar to the similar image portions of the merged first and second shots, wherein when similar image portions in the merged first and second shots are not found, determining whether audio streams of the merged first and second shots are similar, wherein when similar audio streams are found in the merged first and second shots, searching audio streams of the remaining shots to determine if they are are similar to the audio streams of the merged first and second shots and automatically merging the remaining shots, having audio streams that are similar to the audio streams of the merged first and second shots, with the merged first and second shots, wherein when similar audio streams are not found in the merged first and second shots, the action taken by the user on the first shot is automatically repeated on all siblings of the first shot.

19. The method according to claim 18, wherein the step of automatically organizing includes the step of generating the hierarchical structure from groups of visually similar shots, each of the shots representing a continuous action in time and space.

20. The method according to claim 19, wherein the step of viewing includes the steps of:
    viewing the hierarchical structure; and
    modifying the hierarchical structure to make the hierarchical structure substantially useful and meaningful to the user.

21. The method according to claim 18, wherein the step of viewing includes the step of playing the video along with the video's audio from any point in the video.

* * * * *